United States Patent [19]

Neveux

[11] 4,049,020
[45] Sept. 20, 1977

[54] VACUUM CONTROL VALVE

[75] Inventor: Rene Elie Neveux, Les Clayes-sous-Bois, France

[73] Assignee: Societe Anonyme Francaise du Ferodo, Paris, France

[21] Appl. No.: 683,223

[22] Filed: May 4, 1976

[30] Foreign Application Priority Data

May 5, 1975 France .................. 75.13994

[51] Int. Cl.² ........................................... F16K 11/02
[52] U.S. Cl. .............................. 137/625.11; 251/297; 137/625; 137/46
[58] Field of Search ..................... 137/625.11, 625.15, 137/625.46; 251/297, 337

[56] References Cited

U.S. PATENT DOCUMENTS

| | | | |
|---|---|---|---|
| 2,209,136 | 7/1940 | Parker | 137/625.11 |
| 2,217,963 | 10/1940 | Mueller | 251/297 |
| 3,074,431 | 1/1963 | Schwartz et al. | 137/625.11 |
| 3,114,388 | 12/1963 | Hoen | 251/337 X |
| 3,306,572 | 2/1967 | Dore | 251/297 |
| 3,856,045 | 12/1974 | Kenny et al. | 251/297 X |

Primary Examiner—William R. Cline
Attorney, Agent, or Firm—Wigman & Cohen

[57] ABSTRACT

A control valve of the type comprising a rotatable distributing member having a distributing surface having a plurality of coaxial ribs intersected by radially extending rib portions projecting on the distributing surface and engaging a smooth surface of a stationary valve body to define therewith a plurality of coaxial part-annular channels for selectively interconnecting selected ones of a plurality of passages bored through the valve body and opening in the smooth surface. The distributing member is retained in engagement with the valve body by a corrugated spring washer clamped between the outer face of the distributing member and a cap or hood member fastened to the valve body, and the spring washer is fastened against rotation relative to the cap member, while the outer face of the distributing member has a plurality of recesses for receiving the corrugations of the spring washer to hold the distributing member in any one of several angular positions.

7 Claims, 13 Drawing Figures

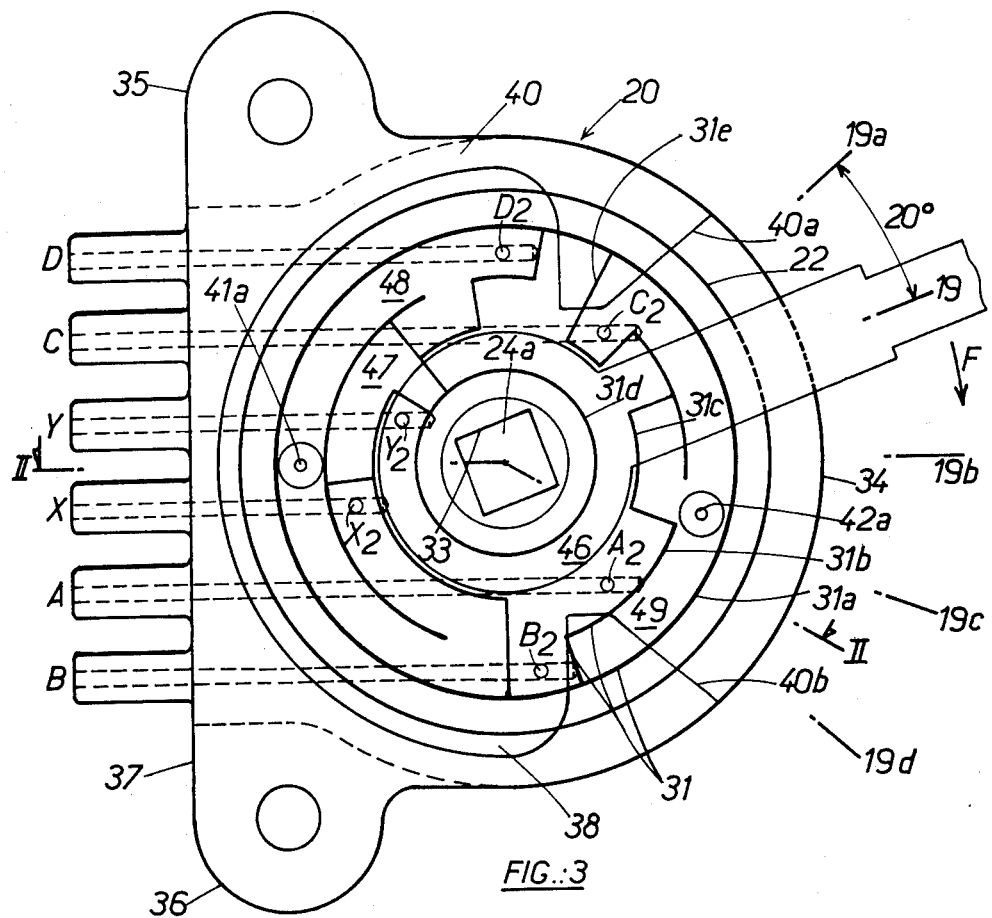
FIG.:3
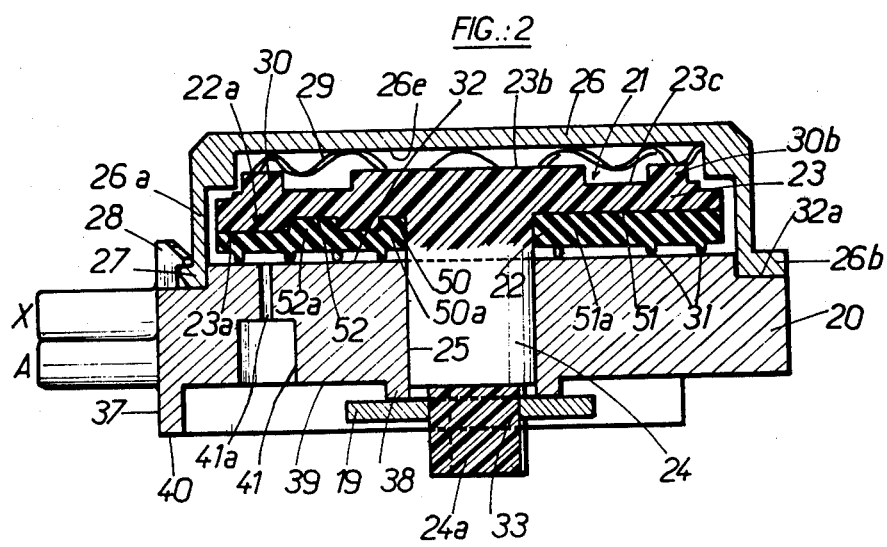
FIG.:2

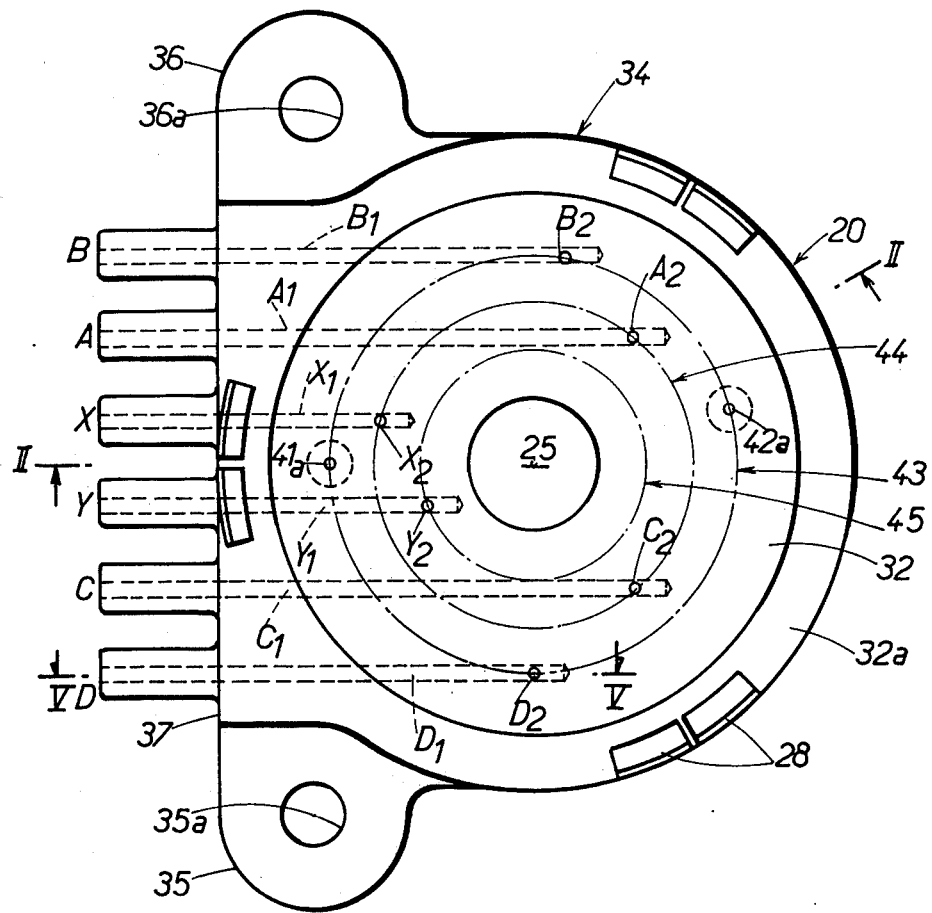
FIG.:4
FIG.:5

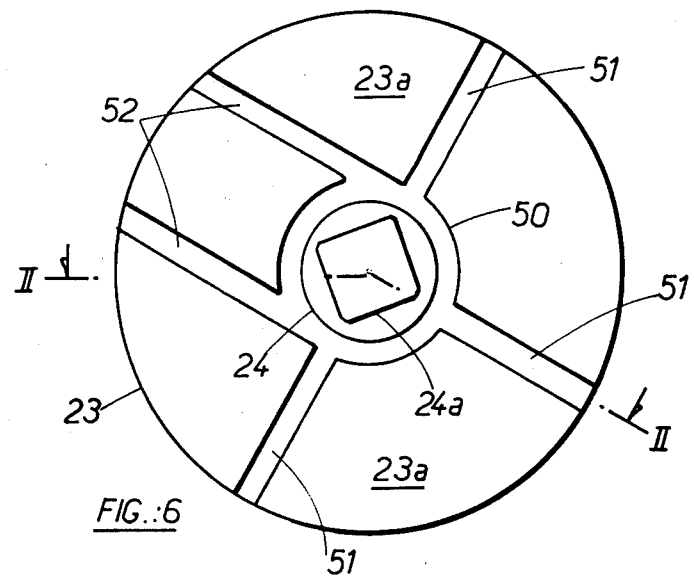
FIG.:6
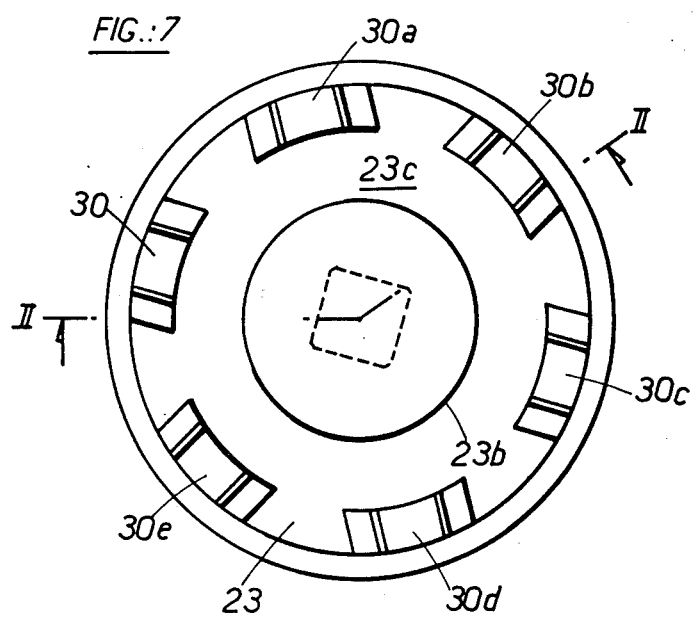
FIG.:7

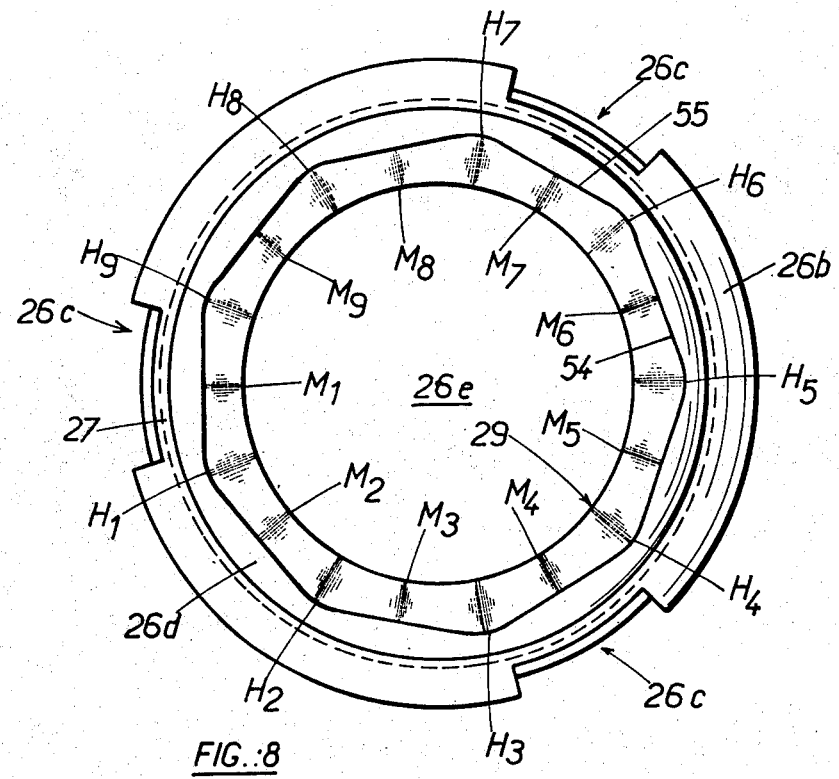
FIG.:8
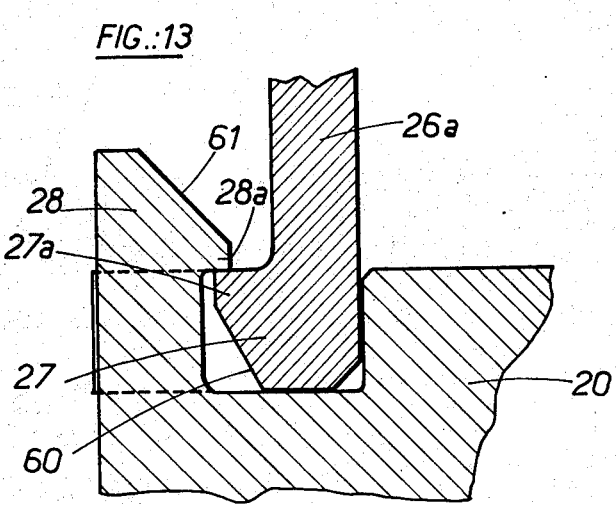
FIG.:13

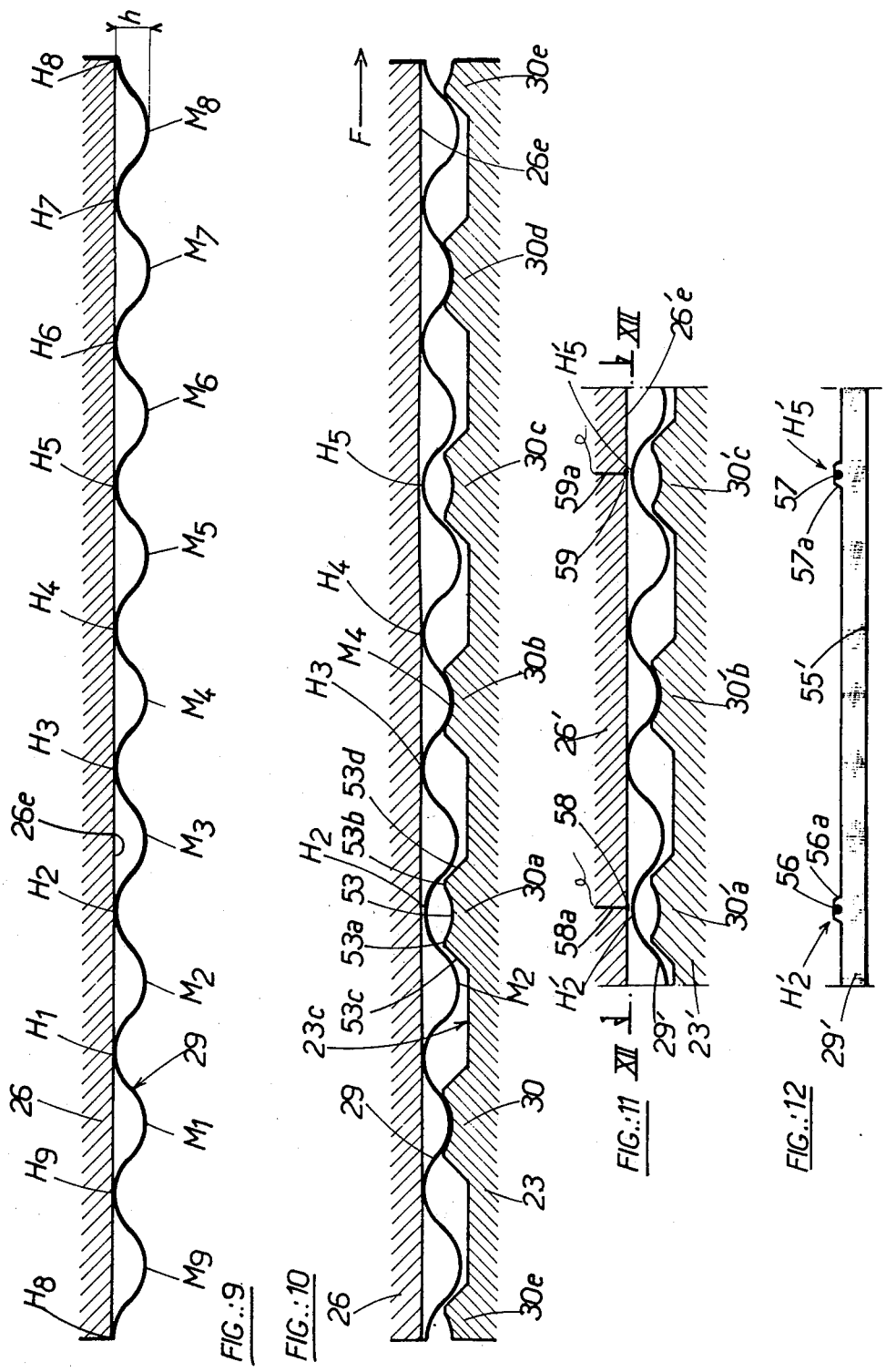

VACUUM CONTROL VALVE

BACKGROUND OF THE INVENTION

This invention relates to control valves of the type comprising a rotatable distributing member which is provided with a plurality of ribs that are disposed in engagement with a cooperating surface of the body of the valve so as to form therewith a plurality of channels to permit selective interconnection of inlet and outlet ports of said valve upon rotation of the distributing member.

Control valves of this type are useful for the vacuum control of fluid circuits, for instance, the vacuum being taken, from the intake manifold of a vehicle engine, to control small vacuum cylinders operating various ventilating and heating apparatuses in the vehicle. Rotation of the distributing member is controlled by means of a lever actuating an axle which is journaled in the valve body. The distributing member is applied by a spring against the cooperating surface of this body. Indexing means have to be provided for holding the distributing member in any one of its useful positions, i.e., the positions ensuring the control of the various cylinders.

U.S. Pat. No. 3,856,045 described a control valve of the above-mentioned type, in which the spring is clamped between two parts that rotate in unison, which renders manufacturing and assembling of the control valve more complicated, and the axle is a member separate from the distributing member, which is engaged in central apertures through the valve body and the distributing member, and which is provided at one end with a flange which is pressed against the outer face of the body, the spring being clamped between the distributing member and a washer which is fixed at the other free end of the axle member. The indexing means comprise cooperating detent teeth provided in the flange integral with the axle member and in the valve body respectively.

One of the objects of the present invention is to reduce the number of component parts of a control valve of the above-metioned type.

Another object is to provide a control valve of the above-mentioned type having a spring that works between a valve body and a distributing member.

Another object is to provide a control valve of the above-mentioned type, including a spring which is useful to apply a distributing member against the cooperating surface of a valve body, and besides to hold the distributing member in any one of its useful positions.

A further object is to provide a control valve of the above-mentioned type, including a spring which can close and open an electrical circuit.

SUMMARY OF THE INVENTION

In accordance with the present invention a control valve of the above-mentioned type comprises a distributing member which is applied against a smooth surface of a valve body by an annulus of spring material having at least three angularly spaced corrugations, the spring annulus being clamped between an inner face of a hood member fastened to the valve body and an outer face of the distributor member respectively, and fastened against rotation with respect to one of said faces, whilst the other face is provided with a plurality of recesses for receiving the corrugations to hold the distributing member in any one of its useful positions.

In an embodiment, the spring annulus is fastened against rotation with respect to said one face by gluing. In another embodiment, a peripheral edge of the annular spring is non circular, for instance polygonal and may be nested in a correspondingly shaped recess of said one face.

BRIEF DESCRIPTION OF THE DRAWINGS

FIG. 2 is a sectional view of the control valve, the section being taken along broken lines II—II of FIGS. 1, 3, 4, 6 and 7;

FIG. 3 is an underneath plan view of the control valve, with the valve body and an operating lever assumed to be transparent;

FIG. 4 is a plan view of the control valve;

FIG. 5 is a part sectional view of the control valve along lines V—V of FIG. 4;

FIG. 6 is an underneath plan view of a plate forming part of the valve member of the control valve;

FIG. 7 is a plan view of this plate;

FIG. 8 is an underneath plan view of a cap forming part of the control valve;

FIG. 9 is a developed view of the profile of a spring contained within the cap;

FIG. 10 is a view similar to FIG. 9, showing the spring acting on the valve member;

FIG. 11 is part of a view similar to FIG. 10 but illustrating the use of the spring for opening and closing electrical contacts;

FIG. 12 is a view of the spring along the lines XII—XII of FIG. 11;

FIG. 13 is a part cross-sectioned view of the control valve illustrating the method of attaching the cap to the body.

DESCRIPTION OF THE PREFERRED EMBODIMENTS

Figure 1:
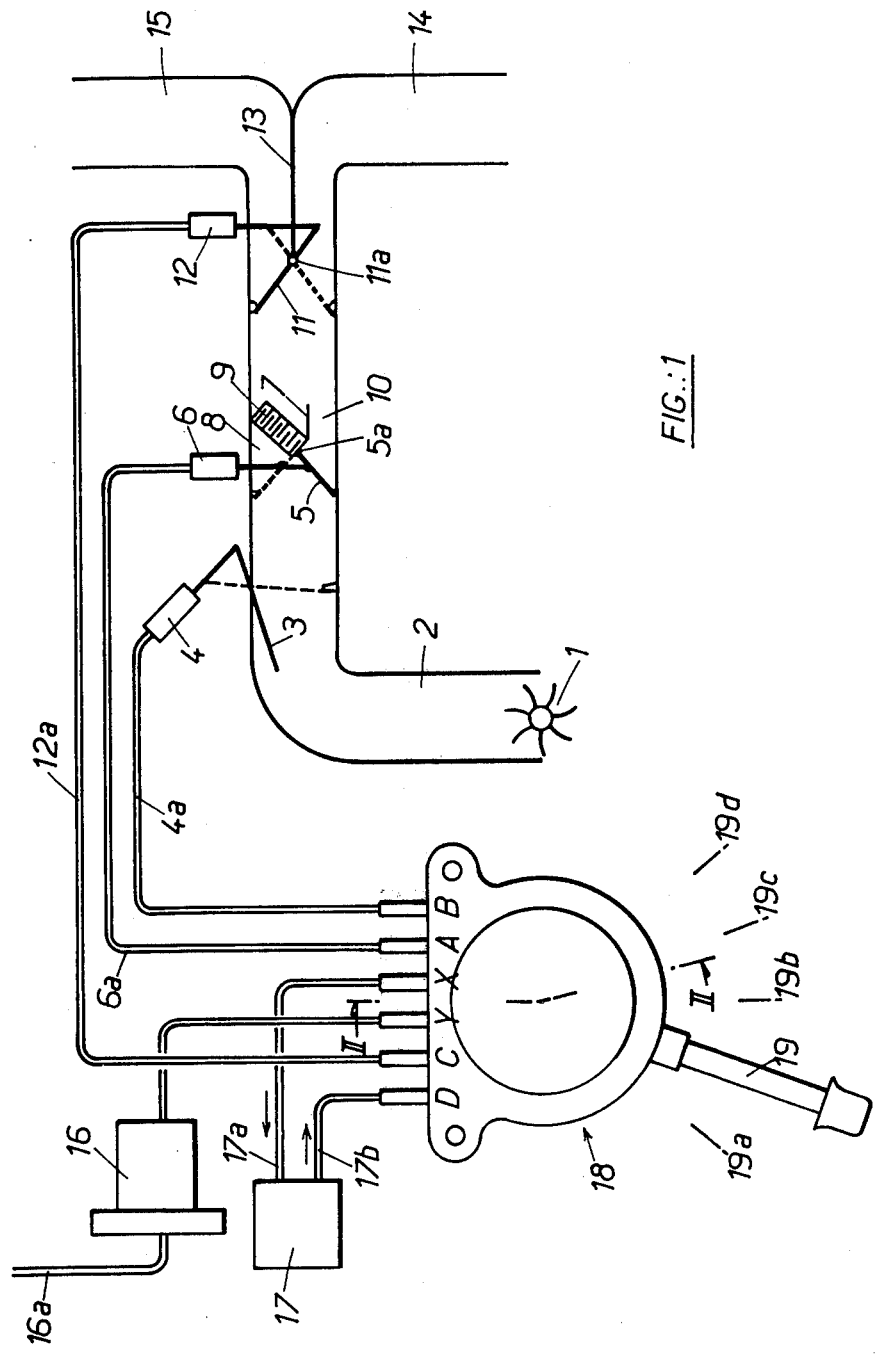
FIG. 1 is a schematic representation of the ventilating and heating system of a motor vehicle and of a pneumatic control circuit including a control valve according to the invention, the operating components being illustrated in the positions which they occupy when the vehicle engine is stopped.

FIG. 1 shows the ventilating and heating system for a motor vehicle, which comprises a fan 1 which causes air to flow into a duct 2. The duct 2 contains in series a stop valve 3 actuated by a first pneumatic piston and cylinder mechanism 4; a "mixing" valve 5 controlled by a second pneumatic piston and cylinder mechanism 6 which effects pivotal movement of the valve member of valve 5 about the axis of a spindle 5a at the end of a partition wall 7 in order to control the flow of air through a passage 8 in which it is heated by means of a heat-exchanger 9 and a passage 10 through which it flows freely without being heated; and a so-called "high low" valve 11 controlled by a third pneumatic piston and cylinder mechanism 12 which pivots the valve member around a spindle 11a at the end of a partition wall 13 to control the flow of air through a heating duct 14 which leads to the lower part of the vehicle (not shown) and through a ventilating and de-icing duct 15 leading to a position adjacent the windscreen (not shown). The valve member of each valve 3, 5, 11 is returned by a spring (not shown) to the position drawn in solid lines and pivots towards the position shown in broken lines against the action of its spring, under the influence of atmospheric pressure that acts on the piston (not shown) of its piston and cylinder mechanism 4, 6, 12 when a reduced pressure is applied thereto, said reduced pressure being transmitted via a pipe 4a, 6a, 12a from a reservoir 16 which is connected by piping 16a to the vehicle engine intake manifold (not shown). The valve members of valves 5 and 11 may also assume intermediate positions when the feed pipes 6a, 12a are connected to the reservoir 16 by means of a regulating device 17.

The pipes 4a, 6a, 12a are connected, as desired, to atmospheric pressure or to the reservoir 16 which is at less than atmospheric pressure, with the additional possibility of pipes 6a and 12a being connected to the regulating device 17, by a control valve with six parts, viz, three parts A, B, C connected respectively to pipes 6a, 4a, 12a, a part Y connected to the reservoir 16, a part X connected to a pipe 17a which provide communication between the regulating device 17 and the reservoir 16, and a port D connected to a pipe 17b subjected to the modified sub-atmospheric pressure produced by the device 17. Control valve 18 is operated by a lever 19 which can occupy five positions that are 20° apart, and which are from left to right, position 19a, "automatic"-;position 19, "stop"position 19b, "ventilation"; position 19c, "defrost" and position 19d, "heating."

The internal construction of the control valve 18, which will be described further on, permits the following connections:

in the automatic position 19a, ports X and Y communicate, so that the reduced pressure of reservoir 16 is transmitted to the regulating device 17 and the modified sub-atmospheric pressure of this device is transmitted to port D; furthermore, ports D, C and A are all interconnected, so that piston and cylinder mechanisms 6 and 12 receive the modified reduced pressure, and port B is open to atmosphere, so that valve 3 is open as shown;

in all other positions, ports X and D are open to atmosphere, so that regulation device 17 is inoperative and pipes 4a, 6a, and 12a are only either open to atmosphere or subject to the reduced pressure of reservoir 16;

in the stop position 19, port C is open to atmosphere (as are ports X and D), so that valve 11 is in its high position as shown and ports Y, A and B are interconnected, so that valve 3 closes duct 2 and valve 5 is in its high position, closing the warm air passage 8;

in the ventilation position 19b, port B is open to atmosphere (as are ports X and D), so that valve 3 is open and ports Y, A and C are interconnected, so that valve 5 is in its high position, closing the warm air passage 8 and valve 11 is in its low position, closing the heating duct 14 and opening the duct 15, which is thus fed with fresh air through passage 10;

in the defrost position 19c, ports B and A are open to atmosphere (as are ports X and D), so that valve 3 is open as stated above and valve 5 is in its low position as shown, closing the fresh air passage 10 and opening the warm air passage 8, and port C communicates with port Y, so that valve 11 is still in its low position, opening duct 15 which is fed with warm air for de-icing;

in the heating position 19d, ports A, B and C are open to atmosphere (as are ports X and D), so that the valves 3 and 5 again open the duct 2 and the warm air passage 8. Valve 11 is in its high position as shown, closing duct 15 and opening the heating duct 14 which is thus fed with warm air from the passage 8. Port Y is isolated, so that the reduced pressure in the reservoir 16 is maintained.

The control valve comprises a body 20; a distributing member 21, consisting of a ribbed, flexible pad 22, which rotates in unison with a disc 23 provided with a hub 24 that swivels in a bore 25 of the body 20; a cap or hood 26 provided with three equi-angular spaced catches 27, which are engaged with corresponding lugs 28 on the body 20; and a spring 29 in the form of a corrugated washer which is held between the cap 26 and projections 30 on the disc 23 in such manner as to press the ribs 31 of the flexible pad 22 firmly against the upper face 32 of the body 20. Disc 23 will turn under the action of the control lever 19 which has a square hole 33 to receive the square cross-section lower end 24a of hub 24.

The control valve is shown from beneath in FIG. 3 and from above in FIG. 4. Its outline consists of an arc of a circle 34 extending between two fixing lugs 35, 36 which are formed with holes 35a, 36a to receive clamping bolts (not represented), the fixing lugs being joined by a flat face 37 from which the six ports A, B, C, D, X, Y project, being arranged in two rows as shown in FIG. 2. The underside of the body is provided with a circular bearing projection 38 (FIG. 2) against which the lever 19 is located; the projection 38 is surrounded by a flat face 39 and a peripheral rib 40 which includes the two lugs 35, 36. The two ends 40a, 40b, of the rib form stops which limit the rotation of the lever 19 to an angle of 80°.

The upper face 32 of the valve body is circular and has a peripheral rebate 32a, from the outer edge of which the engagement lugs 28 extend. The fixing lugs 35, 36 are themselves at a lower level than the peripheral rebate 32a. Each of the ports A, B, C, D, X, Y has a bore $A_1$, $B_1$, $C_1$, $D_1$, $X_1$, $Y_1$ which extends within the body 20 (see FIG. 5) at right angles to a bore $A_2$, $B_2$, $C_2$, $D_2$, $X_2$, $Y_2$ respectively that opens onto the upper flat face 32 of the valve body 20. Moreover the valve body 20 is formed with two passages 41, 42 which open on to the flat face 32 and have orifices 41a, 42a. As FIG. 4 shows, the bores $B_2$, $D_2$, and orifices 41a and 42a are situated on an imaginary circle 43 the centre of which is on the axis of bore 25, the bores $A_2$, $C_2$ and $X_2$ are situated on a circle 44 having a smaller radius and the bore $Y_2$ lies on a circle 45 having a still smaller radius.

The positions of the orifices and the ends of the bore 5 are marked also in FIG. 3 from which it can be seen that the ribs 31 of the flexible pad 32 comprise four concentric arcs 31a, 31b, 31c, 31d which are spaced outwardly from the imaginary circles 43, 44, 45 (FIG. 4) and are intersected by a number of radial ribs 31e so as to form, together with the planar face 32 four channels 46, 47, 48, 49 which are arranged so as to connections between the ports specified above. Effectively:

in the stop position shown in FIG. 3, bores $A_2$, $B_2$ and $Y_2$ open into channel 46, bores $D_2$ and $X_2$ and orifice 41a open into channel 48 and bore $C_2$ and orifice 42a open into channel 49;

if lever 19 is turned through 20° to the left (in FIG. 3) so far as the regulation position 19a, bores $A_2$, $C_2$ and $D_2$ open into channel 46, bores $X_2$ and $Y_2$ open into channel 47 and bore $B_2$ and orifice 41a into channel 48;

if the lever is turned through 20° to the right from the rest position to the ventilation position 19b, bores $A_2$, $C_2$ and $Y_2$ open into channel 46, the bores $X_2$, $D_2$ and orifice 41a into channel 48 and bore $B_2$ and orifice 42a into channel 49. if the lever is turned through 20° from this position 19b into the defrost position 19c, bores $C_2$ and $Y_2$ open into channel 46, bores $D_2$, $X_2$ and orifice 41a into channel 48 and bores $A_2$, $B_2$ and orifice 42a into channel 49;

if the lever is again turned through 20° into the heating position 19d, only bore $Y_2$ opens into channel 46, bores $C_2$, $D_2$ and $X_2$ and orifice 41a open into channel 48 and the bores $A_2$, $B_2$ and orifice 42a open into channel 49.

The disc 23 is shown in FIGS. 2, 6 and 7. Its undersurface 23a includes a circular groove 50 extending around the hub 24, from which circular groove 50 a number of grooves 51 and 52 extend to the periphery of the disc. These grooves receive a circular rib 50a and a number of correspondingly shaped ribs 51a and 52a respectively, which ribs project from the flat upper face 22a of pad 22. The grooves are asymmetrically arranged so as to determine the angular relationship of the pad 22 with respect to the disc 33. When the ribs 50a, 51a and 52a have entered the grooves 50, 51 and 52, the pad 22 rotates with the support disc 23.

The upper surface of disc 23 includes a central portion 23b which protrudes from a flat face 23c which has six equiangularly spaced projections 30, 30a, 30b, 30c, 30d and 30e, whose developed profile is shown in FIG. 10. The profile of each projection includes a concave upper part 53, of arcuate configuration so as to form a reception recess or seat located between two flats 53a, 53b connected by 45°-slopes 53c, 53d respectively to said flat face 23c.

The spring 29 is seen in section in FIG. 2 and in plan in FIG. 8 which also shows the inside of the cap 26. FIGS. 9 and 10 are developed views which illustrate the configuration of the spring 29 within the cap 26, in its free condition in the cap and the configuration of the spring 29 and its disposition with respect to projections 30–30e when the cap 26 is placed on the valve body 20 and the lever 19 is in its "stop" position. The cap 26 is formed as a cup and its rim 26a has an outwardly extending flange 26b having three regularly spaced indentations 26c which are of equal angular extent; in each indentation the ridge of said rim 26a forms one of the catches 27 which are used for fastening the cap to the lugs 28 on the valve body 20 as described in detailed below. The whole central part 26e of the cap 26 is inset relative to the peripheral portion 26d which is adjacent to and integral with the rim 26a, the inner surface of the cap 26 being shaped to form a regular polygonal recess with nine sides 54. The spring 29 is a corrugated steel washer the outward edge 55 of which is shaped as a regular nine-sided polygon which will enter and fit closely within the polygonal recess. This corrugated washer has nine radially outwardly directed "crests" $H_1$–$H_9$ which are situated at the apices of the polygon and nine radially outwardly directed "troughs" $M_1$–$M_9$, situated half-way between the crests.

When the spring is in its free condition (FIG. 9) the nine "crests"[$H_1$–$H_9$ are in contact with the base 26e of recess 54 and the height h of the spring as measured from a crest to the next trough is slightly greater than the distance between bore 26e and the bases of the seats 53 when the cap 26 is fastened in position on the valve body 20 (this position is illustrated in FIGS. 2 and 10). When lever 19 is in its rest position (FIGS. 2 and 10) the three "troughs" $M_1$, $M_4$ and $M_7$ fit in the seats 53 of the three projections 30, 30b and 30d respectively. Thus spring 29 is pre-loaded and reacts against the bore 26e of cap 26 to press plate 22 downwards at three equally spaced positions. Since the coaxial ribs 31a–31d have an angular extent approaching 360° and are interrupted only by short indentations which interconnect the various coaxial portions of the channels 46–49, the ribs 31 on the underside of pad 22 are applied evenly against the upper face 32 of body 20 and air-tightness of said channels is ensured because of the flexibility of said ribs. Moreover the arcuate profile of the seats 53 is adapted to the shape of the "troughs" $M_1$, $M_4$ and $M_7$ in such manner that the spring 29 provides for physical positioning of the distributing member 21, that is to say efficiently maintains this member in the usable position in which it was placed. It can be seen from FIG. 10 that, if the lever 19 is displaced in the direction of arrow F (FIG. 3), with sufficient force to dislodge the "troughs" $M_1$, $M_4$ and $M_7$ out of their seatings, the "troughs" $M_2$, $M_5$ and $M_8$ will be forced simultaneously to move over the slopes 53c of the projections 30a, 30c and 30e. As soon as the "troughs" are past the flats 53b of the projections 30, 30b and 30d and the flats 53a of the projections 30a, 30c and 30e, the three "troughs" $M_2$, $M_5$ and $M_8$ will be located within the seats of the three latter projections, after a 20°-rotation from the rest position. Thus the control valve will again be in the ventilation position. By again turning lever 19 by 20° in the same direction (to the defrost position) the "troughs" $M_3$, $M_6$ and $M_9$ are positioned in the seats 53 of the projections 30b, 30d and 30 respectively so that spring 29 locates the distributing member 21 in this position and so forth.

It is to be noted that in the stop position (FIG. 10), each of the "troughs" such as $M_4$, which is engaged in a seat 53, is moved upwards and this results in slight deformation of the spring 29, so that the two adjacent "crests" such as $H_3$ and $H_4$ are pressed against the base 26e of the cap, while the two following "crests" such as $H_2$ and $H_5$ are displaced away from the base 26e. If the distributing member 21 is turned through 20° as indicated by the arrow F (into the ventilation position), the "troughs" $M_2$ and $M_5$ have to be moved over the projections 30a and 30c respectively, so that the adjacent "crests" $H_2$ and $H_5$ will come into contact with the bore 26e. Similarly it will be seen that when the dispensing member is again rotated through 20°, the two "crests" $H_2$ and $H_5$ will be in contact with the bore 26e in the defrost position and away from it in the heating position. It will also be seen that these two "crests" are in contact with the bore 26e in the regulation position.

In the embodiment of FIG. 11 and 12, provision is made for opening and closing electrical contacts. The inner edge of spring 29' is provided adjacent the "crests"]$H_2$ and $H_5$ with two small tabs 56a, 57a on which droplets of silver brazing 56, 57 are applied. In register therewith on the base 26'e of cap 26' are deposited two other droplets of silver brazing 58, 59 to which are linked two conductors 58a, 59a which extend through the cap and are connected in series in an electrical circuit that is not shown. In the stop and heating positions, the contacts 56 and 57 are spaced from the contacts 58 and 59 so that the circuit is open. In the three other position (regulation, ventilation and de-icing) the contacts 56 and 57 are pressed against contacts 58 and 59 respectively and the electrical circuit is completed by the metallic spring 29'. If the electrical circuit considered is for instance the circuit of fan 1 (FIG. 1), the fan will be automatically actuated in the regulation, ventilation and de frost positions and de actuated in the stop and heating postions, which may be advantageous in certain cases. Of course, this is only an example and the contacts could be used in any other manner.

The valve body 20 and the disc 23 are advantageously made of a polyamide while the cap 26 may be made of tetrafluoroethylene or a similar synthetic plastics material and the flexible pad 22 is preferably formed of an elastomeric resin of neoprene or the like. The use of these materials for the body and the cap with the particular profiles of the catches 27 and the lugs 28, which are shown in detail in FIG. 13, permits fastening of the cap to the body in a detachable manner, because of the relative flexibility of the rim 26a of the cap. In particular, it is seen that the fastening of the cap is obtained by sliding engagement of the outer surface 60 of each catch 27 —which surface is inclined at about 60° to the horizontal — with an inner surface 61, inclined at about 45°, of te corresponding lug. This sliding engagement will cause the rim 26a to be deflected inwardly and the lug 28 to be deflected outwardly until the tip 27a of the catch engages under the nose 28a of the lug.

It goes without saying that the embodiments described are merely examples and that they can be modified, in particular by substitution of technically equivalent means, without departing from the scope of the invention.

In particular the number corrugations of the spring and the number of seats for receiving them can be varied.

In the described embodiments, the corrugations and their seats are both angularly distributed in a regular manner; the distributing member is always supported at three points; there are six ($=3 \times 2$) such seats and nine ($=3 \times 3$) corrugations, which provides, for a complete revolution, 18 positions spaced at 20° (or $2\pi/18$), five only of these positions being used for a 80°-rotation. It is possible to have a number of recesses equal to $(a.b)$ and a number of currugations equal to $(a.c)$, $b$ and $c$ being integers and $a$ an integer greater than or equal to three, which ensures support at a points at least and $(a.b.c)$ stable positions which are spaced by $(2\pi/a.b.c)$.

Instead of having a corrugated profile of approximately sinusoidal shape as shown in FIG. 9 in particular, the annular spring could have a profile similar to ribbed sheets, that is to say with a number of folds each in the form of an inverted U or $\Omega$, the folds being distributed over the spring circumference to form inductations resting resiliently in the seats of the disc 23.

The surface of the body 20 against which the ribs 31 of the distributing member are disposed is not necessarily a planar one. It could have any other rotationally symmetrical shape, for example it could be formed as a truncated cone or might be partly spherical; of course the complementary surface of the distributing member would have ribs of a corresponding configuration.

I claim:
1. A control valve comprising:
a. a valve body having a smooth surface, a plurality of ports, a plurality of passages bored through the valve body and opening in the smooth surface, each said passage leading to a respective one of said ports, and a bore formed centrally though the body;
b. a distributing member having a hub portion engageable though said bore for mounting the distributing member for rotation, a distributing surface with a plurality of ribs extending along coaxial part-circular respective lines and a plurality of radially extending rib portions intersecting the same, said ribs and rib portions projecting on said distributing surface to define therewith and with said smooth surface a plurality of coaxial channels of part-annular shapes and an outer face;
c. an annulus of spring material having at least three angularly spaced currugations athwart the annulus;
d. a hood member, and means fastening the hood member onto said valve body to clamp said spring annulus between an inner face of the hood member and said outer face of said distributing member with resilient deflection of said corrugations, whereby to retain said ribs and rib portions in engagement with said smooth surface of said valve body;
e. means for rotating said hub to place said distributing member selectively into any of a plurality of angular positions wherein selected ones of said passages are interconnected by said channels; and
f. means fastening said spring annulus to one of said outer and inner faces against rotation relative thereto, and a plurality of recesses in the other face for receiving said spring corrugations to hold said distributing member in any one of said angular positions.

2. A control valve as claimed in claim 1, wherein said recesses comprise $(a.b)$ recesses equally spaced angularly, and said corrugations comprise $(a.c)$ corrugations equally spaced angularly, $a$, $b$ and $c$ being integers, and $a$ being at least three.

3. A control valve as claimed in claim 2, wherein said annulus of spring material is a corrugated spring washer.

4. A control valve as claimed in claim 3, wherein said recesses are formed in respective projections protruding on a smooth portion of said other face, and said corrugations engaging said recesses retain smooth face portion at a spacing from said one face, which is greater than the overall thickness of said corrugated spring washer.

5. A control valve as claimed in claim 4, wherein said one face comprises a pair of bearing surfaces for supporting respective portions of said corrugated spring washer to retain a corrugation intermediate said spring portions in any of said recesses, said respective spring portions being spaced from said bearing surfaces by resilient deflection of said corrugated spring washer to retain a corrugation adjacent said intermediate corrugation in any of said recesses, comprising a pair of electrical contacts fitted on one of said bearing surfaces and spring portions respectively, for closing and opening an electrical circuit.

6. A control valve as claimed in claim 1, wherein said annulus of spring material has a non-circular peripheral edge, and said one face has a recess of corresponding shape for receiving said annulus.

7. A control valve as claimed in claimd 1, wherein said means fastening said spring annulus to said one face comprises gluing.

* * * * *